(12) United States Patent  (10) Patent No.: US 7,823,248 B2
Lin  (45) Date of Patent: Nov. 2, 2010

(54) MULTI-FUNCTION VACUUM COLLECTOR

(75) Inventor: Kun Yi Lin, Taichung (TW)

(73) Assignee: Chang Tjer Industrial Co., Ltd., Jenmei Li Beitun, Taichung (TW)

( * ) Notice: Subject to any disclaimer, the term of this patent is extended or adjusted under 35 U.S.C. 154(b) by 74 days.

(21) Appl. No.: 12/381,707

(22) Filed: Mar. 16, 2009

(65) Prior Publication Data

US 2010/0229329 A1  Sep. 16, 2010

(51) Int. Cl.
 *A47L 5/38* (2006.01)
(52) U.S. Cl. .......................................... 15/301; 15/352
(58) Field of Classification Search .................... 15/301, 15/352, 353, 327.1, 310, 347; 55/429, 472
See application file for complete search history.

(56) References Cited

U.S. PATENT DOCUMENTS 4,704,764 A * 11/1987 Metelko, Jr. ................. 15/301
6,507,974 B1 * 1/2003 Cheng ......................... 15/347
7,201,785 B2   4/2007 Lin
7,217,307 B2 * 5/2007 Cheng ......................... 55/356
7,318,249 B2   1/2008 Lin
2009/0106931 A1 * 4/2009 Lin ............................. 15/347

* cited by examiner

*Primary Examiner*—Dung Van Nguyen
(74) *Attorney, Agent, or Firm*—Charles E. Baxley

(57) ABSTRACT

A vacuum collector includes an upright support supported on a base, a housing disposed on top of the upright support, a fan device attached to the housing, a dust collecting receptacle attached to the housing for collecting the dirt, a tubular member has one end coupled to the housing for guiding the dirt into the housing and has a manifold, and the other end coupled to a mouth, two valve devices are coupled to the mouth and the manifold for controlling the dirt to selectively flow into the housing from the mouth or from the manifold, or from the ground, the plants or work places where the machine tools are located, or the other places where are full of dirt or dust or ash.

8 Claims, 6 Drawing Sheets

MULTI-FUNCTION VACUUM COLLECTOR

BACKGROUND OF THE INVENTION

1. Field of the Invention

The present invention relates to a vacuum collector, and more particularly to a multi-function vacuum collector including a control or valve device for switching or controlling the vacuum collector to collect the dirt or the ash either from the wood working machines or from the ground or the other places.

2. Description of the Prior Art

Typical vacuum collectors comprise a duct arm or a trunk for directing toward the dust or dirt or fume to be collected, an electric vacuum motor or pump for vacuuming or drawing the dust or dirt or fume into or through the duct arm or the trunk, and a screen filter member attached to one end of the duct arm or the trunk for receiving and collecting the dirt.

For example, U.S. Pat. No. 7,201,785 to Lin discloses one of the typical dust collecting machines designed and provided for collecting or removing the dirt or ash from the machine tools, such as the wood working machines.

However, the typical dust collecting machines may only be used to vacuum or collect the dirt or ash from the machine tools, such as the wood working machines only, but may not be used to vacuum or collect the dirt or ash from the ground or the other places.

U.S. Pat. No. 7,318,249 to Lin discloses another typical dust collecting machine also designed and provided for collecting or removing the dirt or ash from the machine tools, such as the wood working machines.

However, similarly, the typical vacuum collectors may only be used to vacuum or collect the dirt or ash from the plants where the machine tools, such as the wood working machines are located, but may not be used to vacuum or collect the dirt or ash from the ground or the other places.

The present invention has arisen to mitigate and/or obviate the afore-described disadvantages of the conventional vacuum collectors.

SUMMARY OF THE INVENTION

The primary objective of the present invention is to provide a vacuum collector including a control or valve device for switching or controlling the vacuum collector to collect the dirt or the ash either from the wood working machines or from the ground or the other places.

In accordance with one aspect of the invention, there is provided a vacuum collector comprising a base, an upright support provided on the base, a housing disposed on top of the upright support, a fan device attached to the housing for vacuuming a dirt into the housing, a dust collecting receptacle attached to the housing for collecting the dirt, a control device including a tubular member having a first end coupled to the housing and communicative with the housing for guiding the dirt into the housing, and the tubular member including a manifold, and including a second end coupled to a mouth, a first valve device coupled to the mouth for controlling the dirt to selectively flow into the housing from the mouth, and a second valve device coupled to the manifold for controlling the dirt to selectively flow into the housing from the manifold, and for controlling the dirt to selectively flow into the housing from the ground, the plants or work places where the machine tools are located, or the other places where are full of dirt or dust or ash or the like.

The base includes an orifice formed therein, the mouth is attached to the base and communicative with the orifice of the base, and the first valve device is attached to the base and coupled to the mouth.

The first valve device includes a valve member slidably attached to the first valve device and movable relative to the orifice of the base for selectively opening and blocking the orifice of the base.

The base includes a wheel device attached to bottom of the base, and the mouth is attached to bottom of the base and disposed beside the wheel device.

The second end of the tubular member is coupled to the mouth with a duct, such as a flexible duct. The upright support includes an outer cover panel having an aperture formed therein for receiving the manifold.

The second valve device includes a valve member slidably attached to the second valve device and movable relative to the second valve device for selectively opening and blocking the second valve device.

A motor is further provided and attached to the housing and coupled to the fan device for driving the fan device to vacuum and to draw the dirt into the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
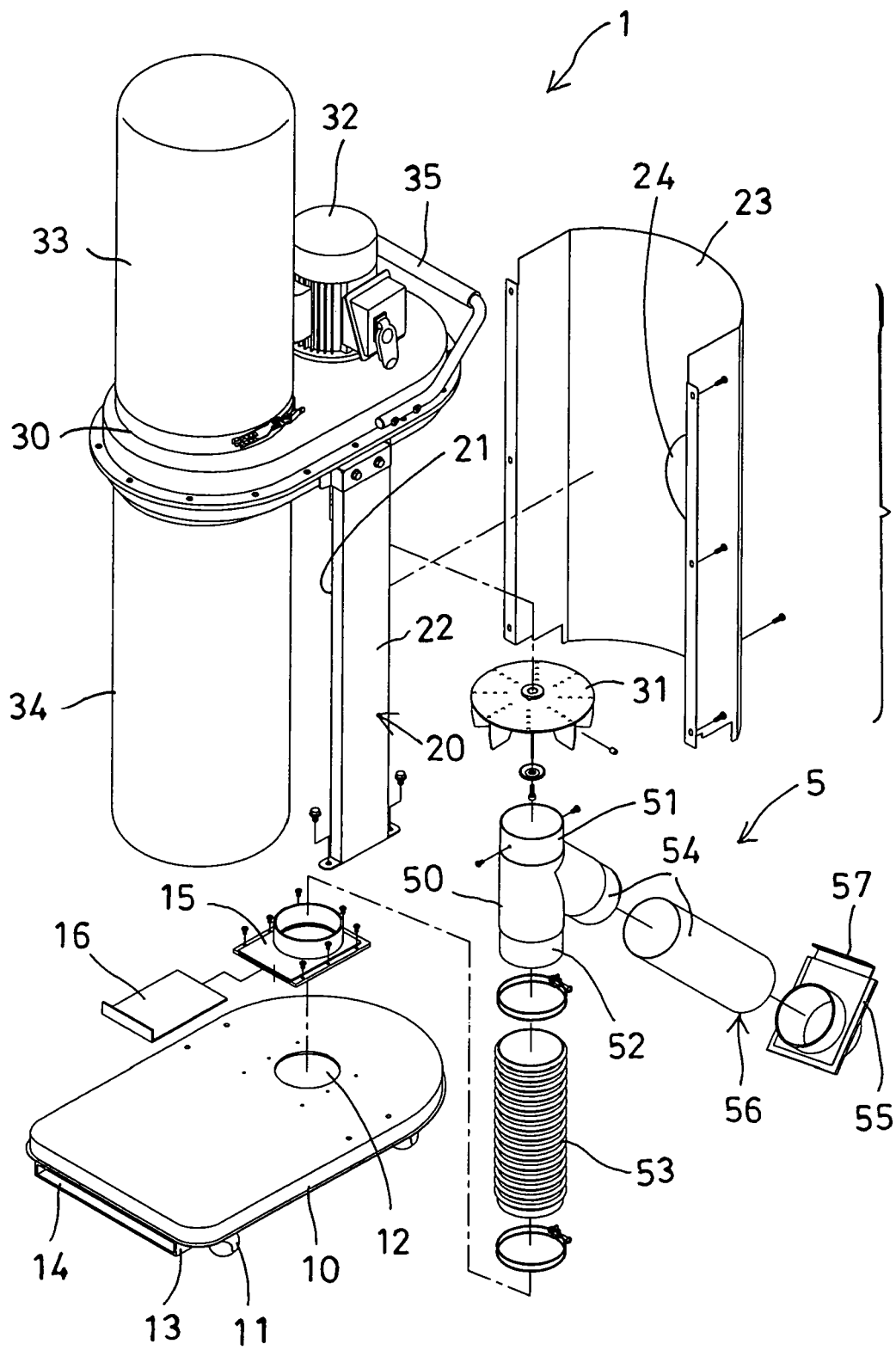
FIG. 1 is a partial exploded view of a vacuum collector in accordance with the present invention.
Figure 2:
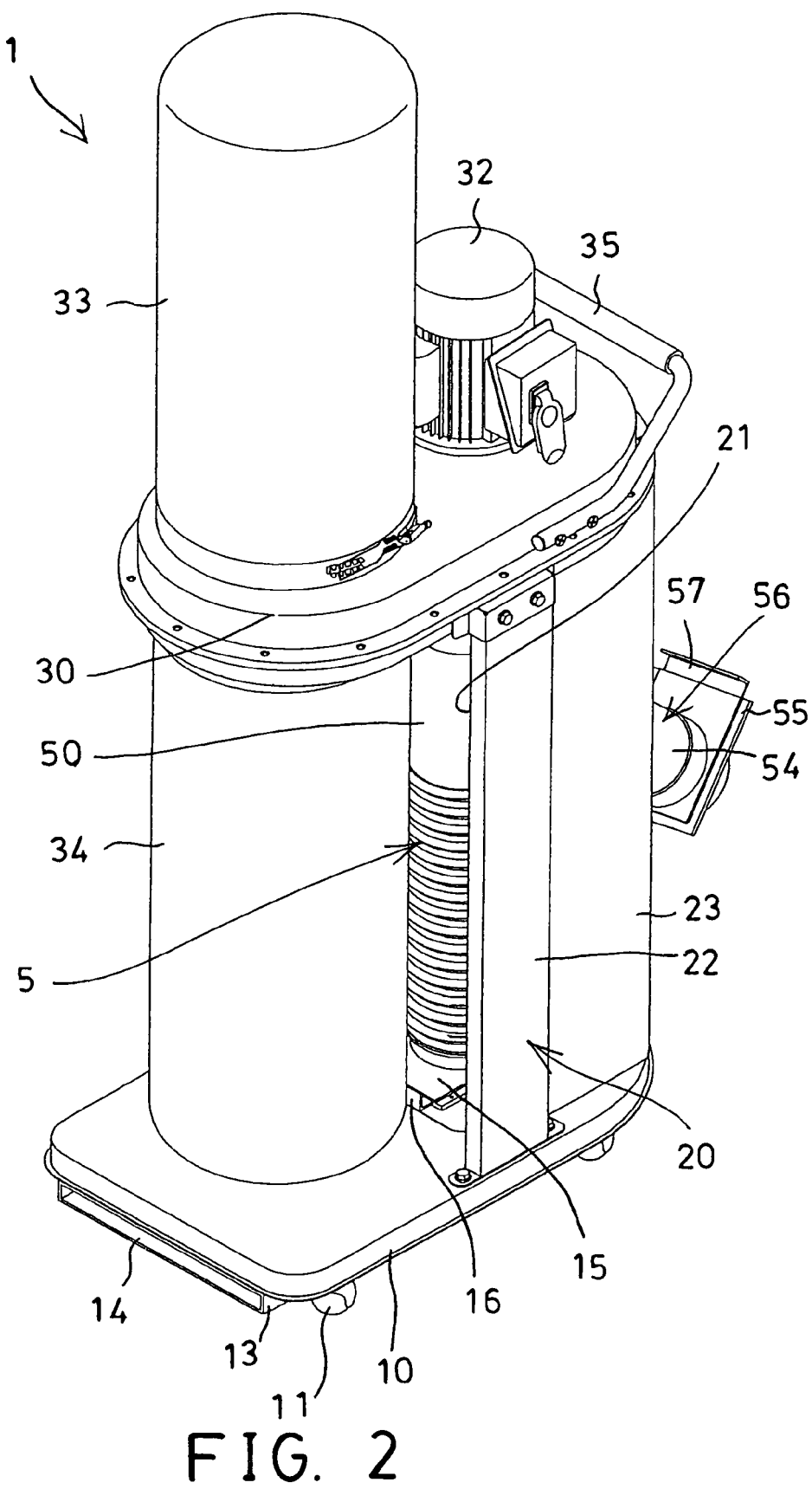
FIG. 2 is a perspective view illustrating the outer appearance of the vacuum collector.
Figure 3:
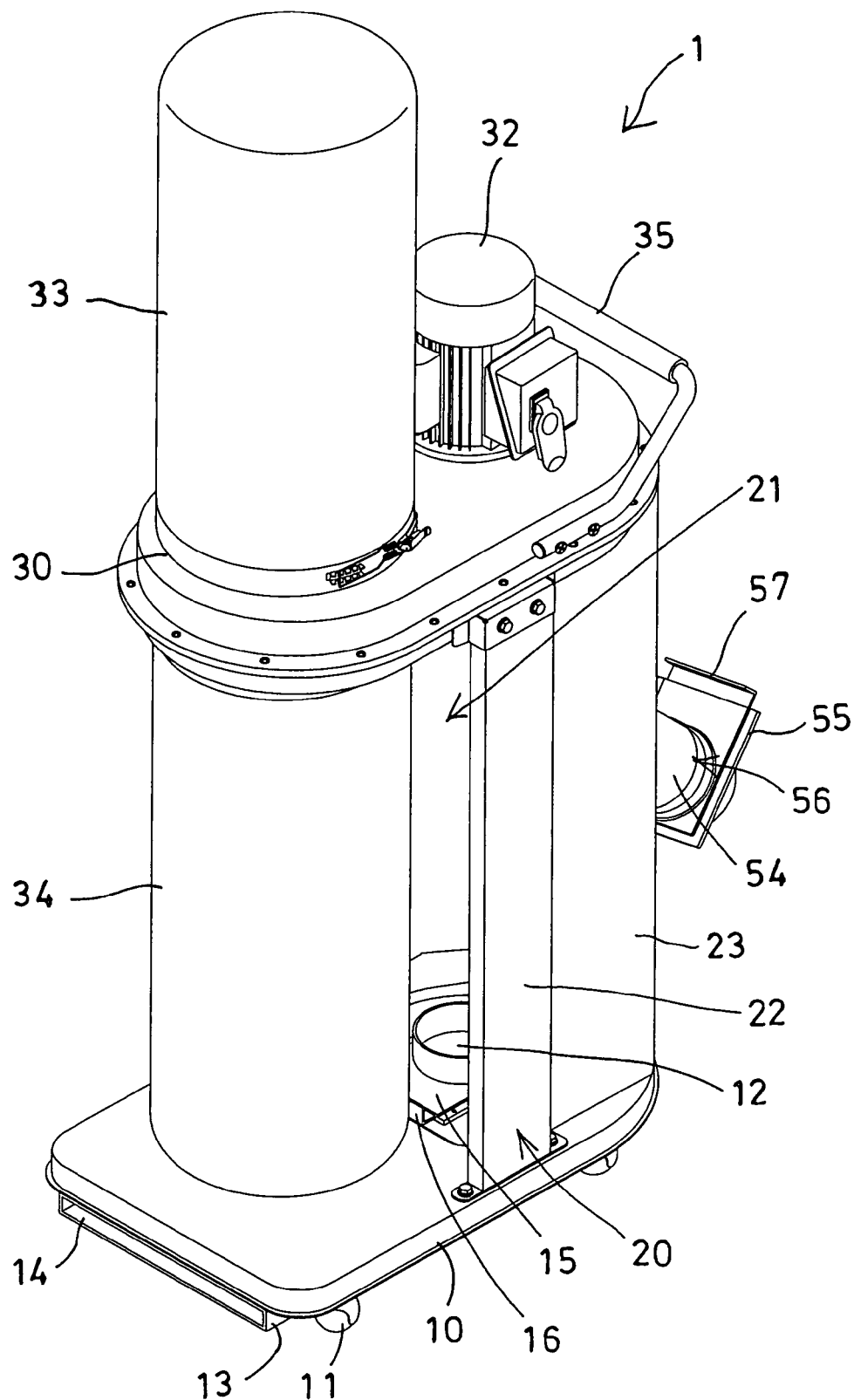
FIG. 3 is a partial perspective view of the vacuum collector.

Referring to the drawings, and initially to FIG. 1, a vacuum collector 1 in accordance with the present invention comprises a base 10 including two or more wheels 11 attached to the bottom thereof for moving the base 10 to any suitable positions or locations, and including an orifice 12 formed therein (FIGS. 1, 3, and 6-7), and including a trough or mouth 13 attached to the bottom portion of the base 10 and disposed or arranged between or beside the wheels 11 and having a depth or thickness smaller than that of the wheels 11, and the mouth 13 is communicative with the orifice 12 of the base 10 and includes an opening 14 directly sidewise or forwardly for coupling to a vacuum nozzle fitting or trunks or duct arms or other nozzle members (not shown).

A valve device 15 is attached or secured onto the base 10 and disposed or arranged above or aligned with the orifice 12 of the base 10 and/or coupled to the mouth 13, and includes a valve member 16 slidably attached to the valve device 15 and movable relative to the orifice 12 of the base 10 for selectively opening the orifice 12 of the base 10 (FIGS. 5, 7) or for selectively closing or blocking the orifice 12 of the base 10 (FIGS. 4, 6) and thus for controlling the dirt, the dust or the ash to be selectively vacuumed or drawn into or through the orifice 12 of the base 10 from ground or the other places.

An upright support 20 is attached or secured or provided or extended upwardly from the base 10, and includes a chamber 21 formed in the upright support 20 and defined by such as two side panels 22 and an outer cover panel 23, in which the outer cover panel 23 includes an aperture 24 formed therein (FIG. 1). A vacuum housing 30 is disposed on top of the upright support 20, and a fan device 31 (FIG. 1) is attached or disposed or engaged into or within the housing 30 and preferably arranged or disposed above the chamber 21 of the upright support 20 for air drawing or vacuuming purposes, and an electric vacuum pump or driving device or motor 32 is further provided and disposed or attached to the upper portion of the housing 30 and coupled to the fan device 31 for rotating or driving the fan device 31 to vacuum or to draw the dust or dirt or fume into the housing 30.

A filter canister or dust collecting receptacle 33 may be provided and disposed above the housing 30 and attached or coupled to the upper portion of the housing 30 and communicative with the housing 30 for receiving and collecting the light weight dust or dirt, and another dust collection barrel or dust collecting receptacle 34 may further be provided and disposed below the housing 30 and attached or coupled to the lower portion of the housing 30 and communicative with the housing 30 for receiving and collecting the larger dirt or particles that may be dropped into and collected within the dust collecting receptacle 34, and the dust collecting receptacles 33, 34 may be selectively and detachably coupled or locked or secured to the housing 30 with locking or latching devices, such as the quick-release locking or latching devices (not shown) or the like. The housing 30 includes a handle 35 for moving the vacuum collector 1 to any suitable positions or locations.

The vacuum collector 1 further includes a control device 5 having a tubular member 50 which includes an upper portion or first end or one end 51 coupled to the lower portion of the housing 30 and communicative with the housing 30 for guiding or directing the dust or the dirt into the housing 30, and the tubular member 50 further includes a lower portion or second end or the other end 52 coupled to the valve device 15 and/or to the orifice 12 of the base 10 directly or indirectly with a bellows duct or flexible duct 53, for allowing the dust or the dirt to be vacuumed or drawn from the valve device 15 and the orifice 12 of the base 10 through the tubular member 50 and then into the housing 30, and then to be collected within the dust collecting receptacles 33, 34.

The tubular member 50 further includes a manifold 54 extended therefrom or engaged through the aperture 24 of the outer cover panel 23, and another valve device 55 is attached or secured onto the free end portion 56 of the manifold 54 and includes a valve member 57 slidably attached to the valve device 55 for selectively opening or closing or blocking the manifold 54 of the tubular member 50 and thus for controlling the dirt or the ash to be selectively vacuumed or drawn into or through the manifold 54 of the tubular member 50, in which the valve device 55 and/or the free end portion 56 of the manifold 54 may be coupled to the machine tools, such as the wood working machines (not shown) with various nozzle fittings or trunks or duct arms or other nozzle members (not shown) for drawing or vacuuming the dirt or the ash from the machine tools.

Figure 4:
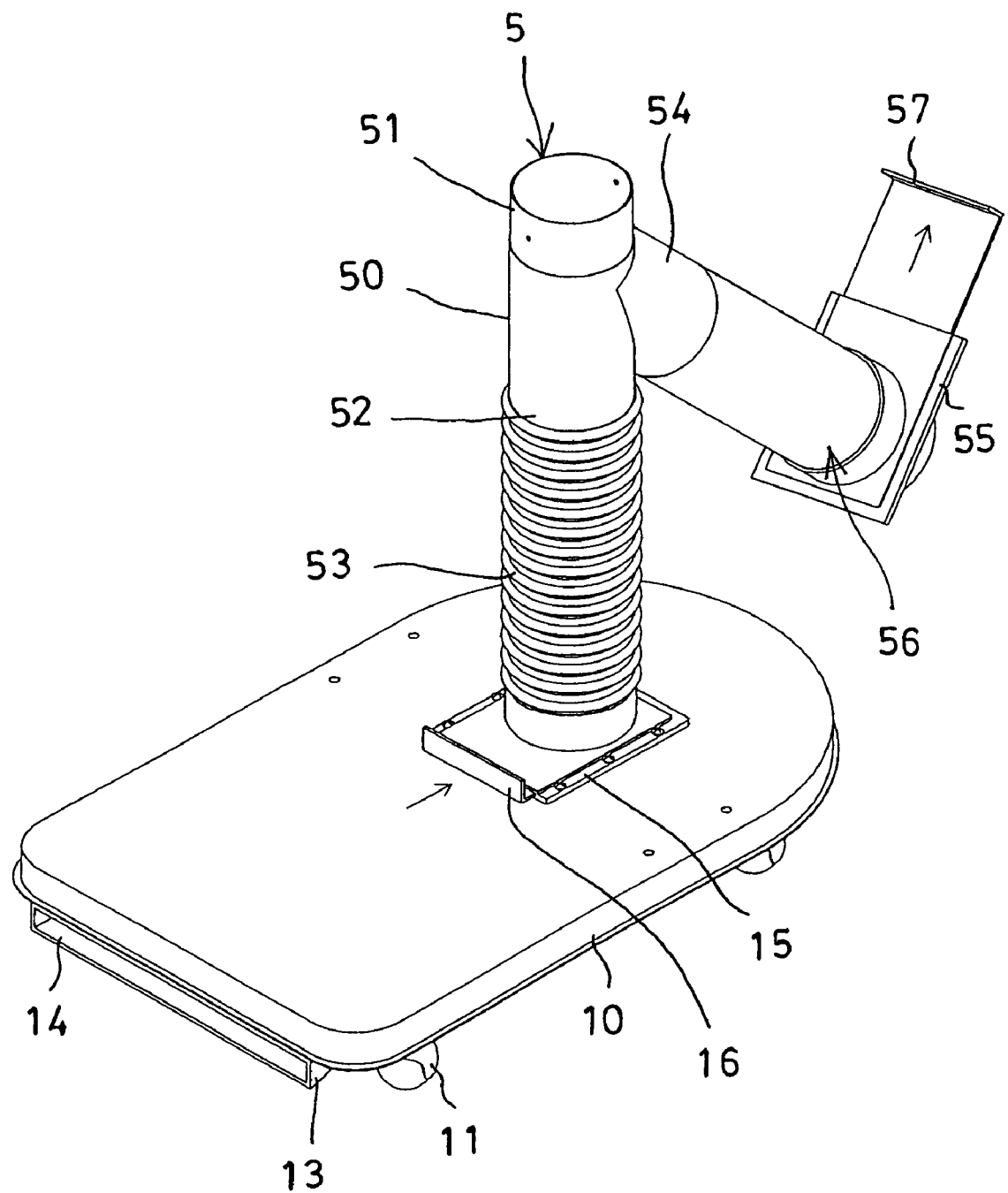
FIG. 4 is another partial perspective view illustrating the base and the control or valve device of the vacuum collector.
Figure 5:
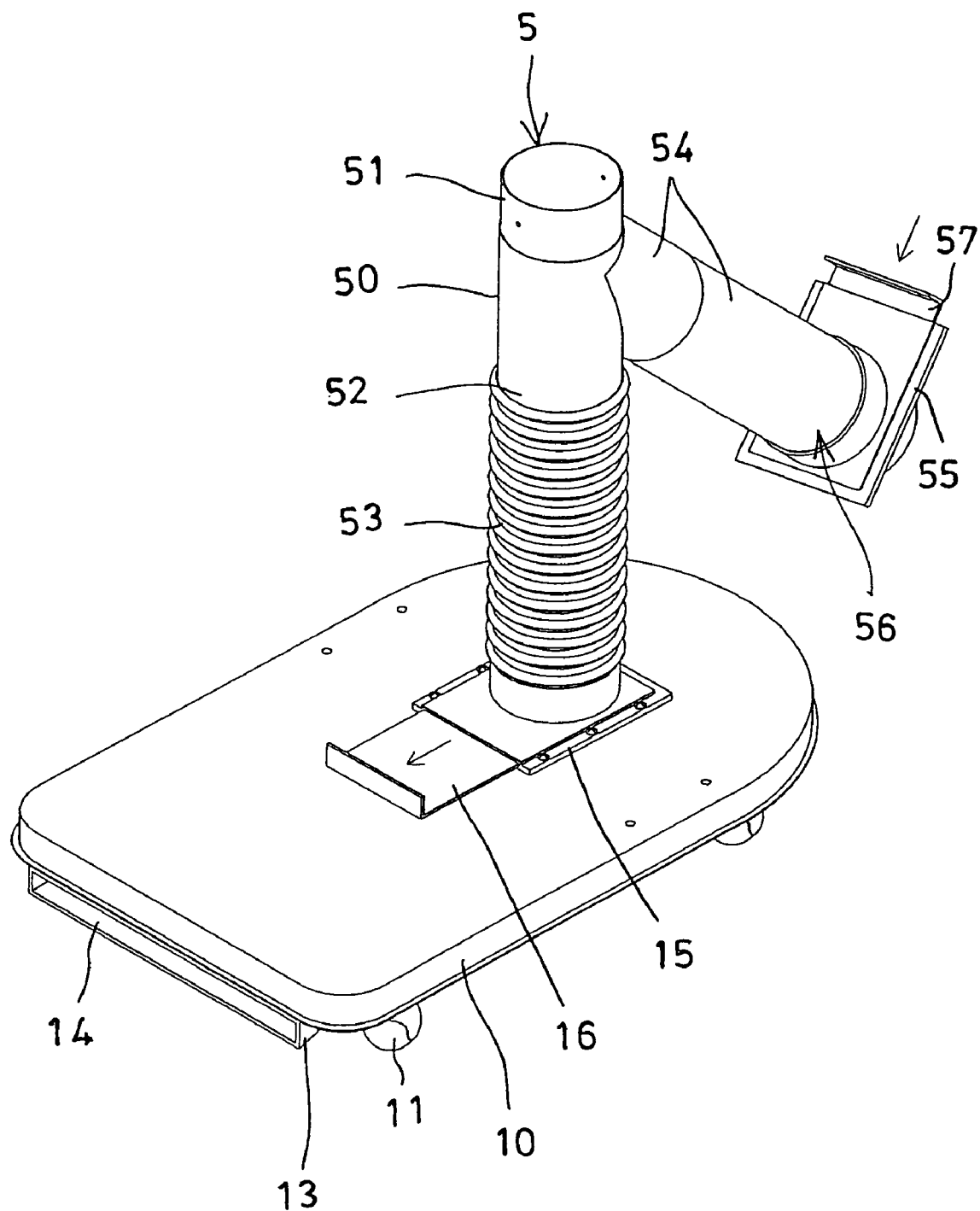
FIG. 5 is a further partial perspective view similar to FIG. 4, illustrating the operation of the vacuum collector.
Figure 6:
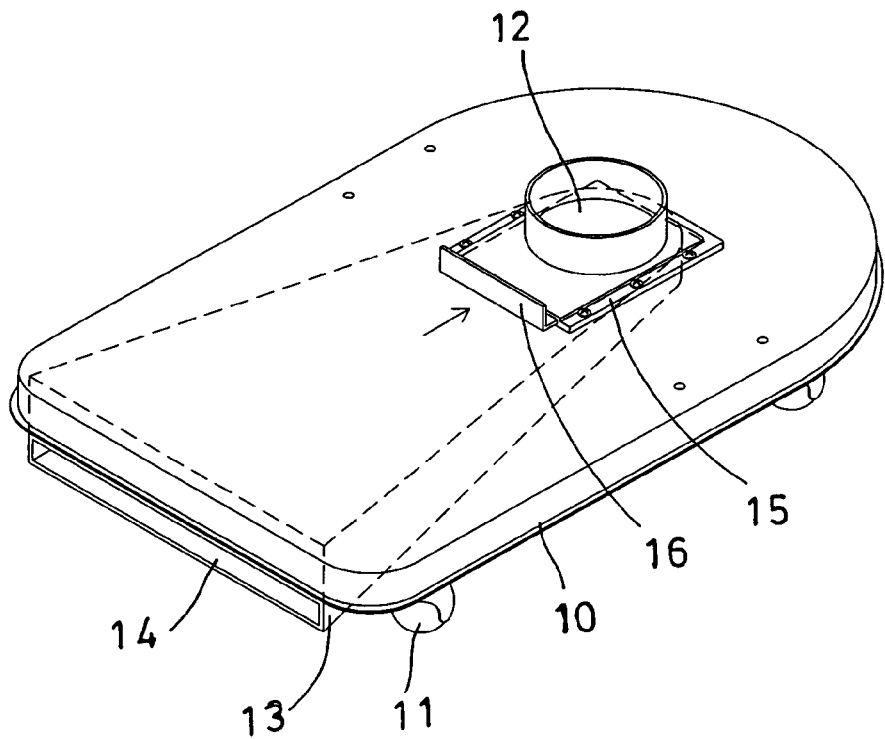
FIGS. 6, 7 are still further partial perspective views illustrating the operation of the vacuum collector.
Figure 7:
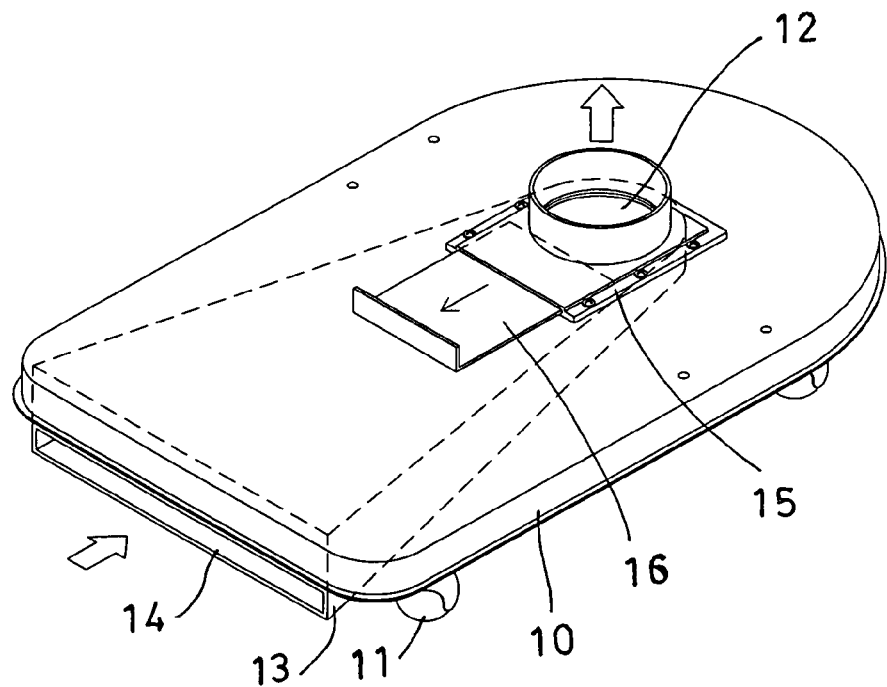

In operation, as shown in FIGS. 4 and 6, the valve member 16 may be moved relative to the valve device 15 to selectively close or block the orifice 12 of the base 10, and the valve member 57 or the valve device 55 may selectively open the manifold 54 of the tubular member 50 for allowing the dust or the dirt to be vacuumed or drawn from the valve device 55 and the manifold 54 of the tubular member 50 into the housing 30, and then to be collected within the dust collecting receptacles 33, 34. On the contrary, as shown in FIGS. 5 and 7, the manifold 54 of the tubular member 50 may be selectively closed or blocked with the valve device 55, and the orifice 12 of the base 10 may be selectively opened or controlled with the valve device 15 for allowing the dust or the dirt to be vacuumed or drawn from the valve device 15 and the orifice 12 of the base 10 through the tubular member 50 and then into the housing 30, and then to be collected within the dust collecting receptacles 33, 34.

It is to be noted that the dust or dirt or ash may fly everywhere in the plants or work places where the machine tools, such as the wood working machines are located, but the typical dust collecting machines are designed and provided for collecting or removing the dust or dirt or ash from the machine tools, such as the wood working machines only, but may not be used to collect or remove the dirt or ash from the other places, such that an additional vacuum cleaner is further required to be provided to clean the dust or dirt or ash from the ground or the other places. The vacuum collector in accordance with the present invention may be used to collect or remove the dirt or ash from the ground, the plants or work places where the machine tools are located, and the other places.

Accordingly, the vacuum collector in accordance with the present invention includes a control or valve device for switching or controlling the vacuum collector to collect the dirt or the ash either from the wood working machines or from the ground or the other places.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A vacuum collector comprising:
   a base,
   an upright support provided on said base,
   a housing disposed on top of said upright support,
   a fan device attached to said housing for vacuuming a dirt into said housing,
   a dust collecting receptacle attached to said housing for collecting the dirt,
   a control device including a tubular member having a first end coupled to said housing and communicative with said housing for guiding the dirt into said housing, and said tubular member including a manifold, and including a second end coupled to a mouth,
   a first valve device coupled to said mouth for controlling the dirt to selectively flow into said housing from said mouth, and
   a second valve device coupled to said manifold for controlling the dirt to selectively flow into said housing from said manifold.

2. The vacuum collector as claimed in claim 1, wherein said base includes an orifice formed therein, said mouth is attached to said base and communicative with the orifice of the base, and said first valve device is attached to said base and coupled to said mouth.

3. The vacuum collector as claimed in claim 2, wherein said first valve device includes a valve member slidably attached to said first valve device and movable relative to said orifice of said base for selectively opening and blocking said orifice of said base.

4. The vacuum collector as claimed in claim 1, wherein said base includes a wheel device attached to bottom of said base, and said mouth is attached to bottom of said base and disposed beside said wheel device.

5. The vacuum collector as claimed in claim 1, wherein said second end of said tubular member is coupled to said mouth with a duct.

6. The vacuum collector as claimed in claim 1, wherein said upright support includes an outer cover panel having an aperture formed therein for receiving said manifold.

7. The vacuum collector as claimed in claim 1, wherein said second valve device includes a valve member slidably attached to said second valve device and movable relative to said second valve device for selectively opening and blocking said second valve device.

8. The vacuum collector as claimed in claim 1 further comprising a motor attached to said housing and coupled to said fan device for driving said fan device to vacuum and to draw the dirt into said housing.

* * * * *